(12) United States Patent
Blaurock

(10) Patent No.: US 6,484,599 B2
(45) Date of Patent: Nov. 26, 2002

(54) NUT UNIT

(75) Inventor: Werner Blaurock, Niederwerrn (DE)

(73) Assignee: Rexroth Star GmbH (DE)

( * ) Notice: Subject to any disclaimer, the term of this patent is extended or adjusted under 35 U.S.C. 154(b) by 11 days.

(21) Appl. No.: 09/770,353

(22) Filed: Jan. 26, 2001

(65) Prior Publication Data

US 2001/0027693 A1 Oct. 11, 2001

(30) Foreign Application Priority Data

Jan. 28, 2000 (DE) .......................... 100 03 619

(51) Int. Cl.⁷ .............................. F16H 25/22
(52) U.S. Cl. .................. 74/424.75; 74/424.77; 74/424.88
(58) Field of Search .............. 74/424.75, 424.77, 74/424.81, 424.82, 424.88, 441

(56) References Cited

U.S. PATENT DOCUMENTS

| | | | | |
|---|---|---|---|---|
| 2,855,791 A | * | 10/1958 | Hogan ...................... | 74/424.75 |
| 4,074,587 A | * | 2/1978 | Brusasco ................. | 74/424.77 |
| 4,186,620 A | | 2/1980 | Brusasco | |
| 4,186,621 A | * | 2/1980 | Brusasco ................. | 74/424.83 |
| 4,612,817 A | * | 9/1986 | Neff ........................ | 74/424.75 |
| 4,832,550 A | * | 5/1989 | Nilsson ...................... | 411/252 |
| 5,142,929 A | * | 9/1992 | Simpson, III ............ | 74/424.87 |

FOREIGN PATENT DOCUMENTS

| | | |
|---|---|---|
| DE | 2732896 | 5/1978 |
| DE | 2810001 | 9/1978 |
| DE | 2805141 | 8/1979 |
| DE | 3028543 | 2/1982 |
| DE | 19646245 | 5/1997 |
| GB | 2307020 | 5/1997 |
| JP | 61-153051 | * 7/1986 |

OTHER PUBLICATIONS

English language abstract for DE 30 28 543.
English language abstract for DE 28 05 141.
English language abstract for DE 27 32 896.

* cited by examiner

Primary Examiner—William C Joyce
(74) Attorney, Agent, or Firm—Baker Botts LLP

(57) ABSTRACT

A nut unit (20) for use in a ball screw drive comprises a sleeve-shaped nut body (10) that is made of an essentially rigid material and that has an axis (A) and an inner circumferential surface (14). A one-piece, channel-shaped, ball-guiding strip material helix (18) is arranged on the inner circumferential surface (14) of the nut body (10). The strip material helix (18) is mounted within a concavely-curved support groove (16) formed in the inner circumferential surface (14) of the nut body (10). The helix (18) has an external convexly-curved profile (46), which is embodied with external profile flank regions (46') and an external profile crown region (46"). The helix (18) defines, by means of a curved internal profile (48) facing the axis (A), a ball channel with an internal profile base region (48") and two internal profile flank regions (48'). The outer profile flank regions are essentially rigidly supported by the support profile of the support groove (16).

6 Claims, 5 Drawing Sheets

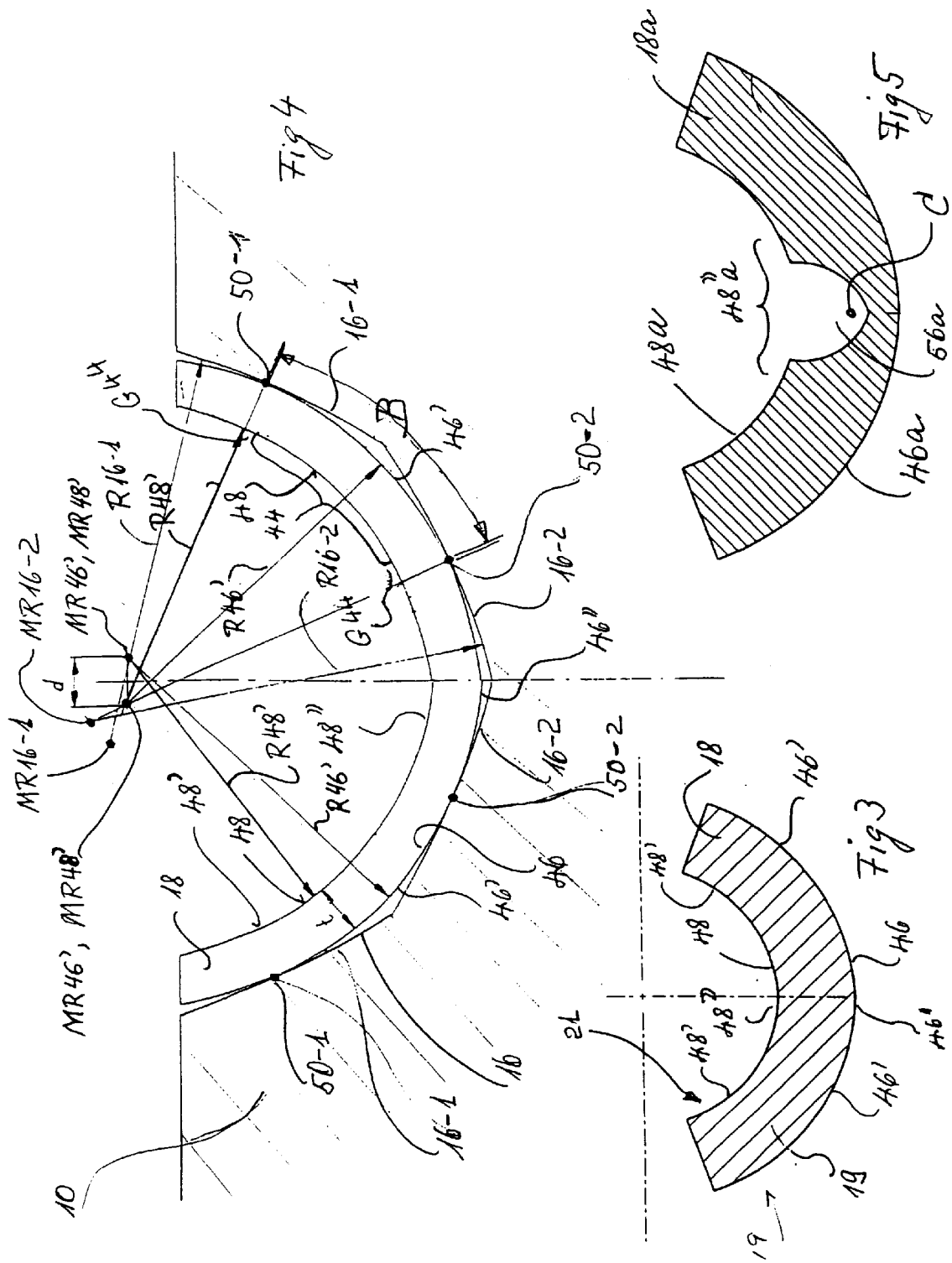

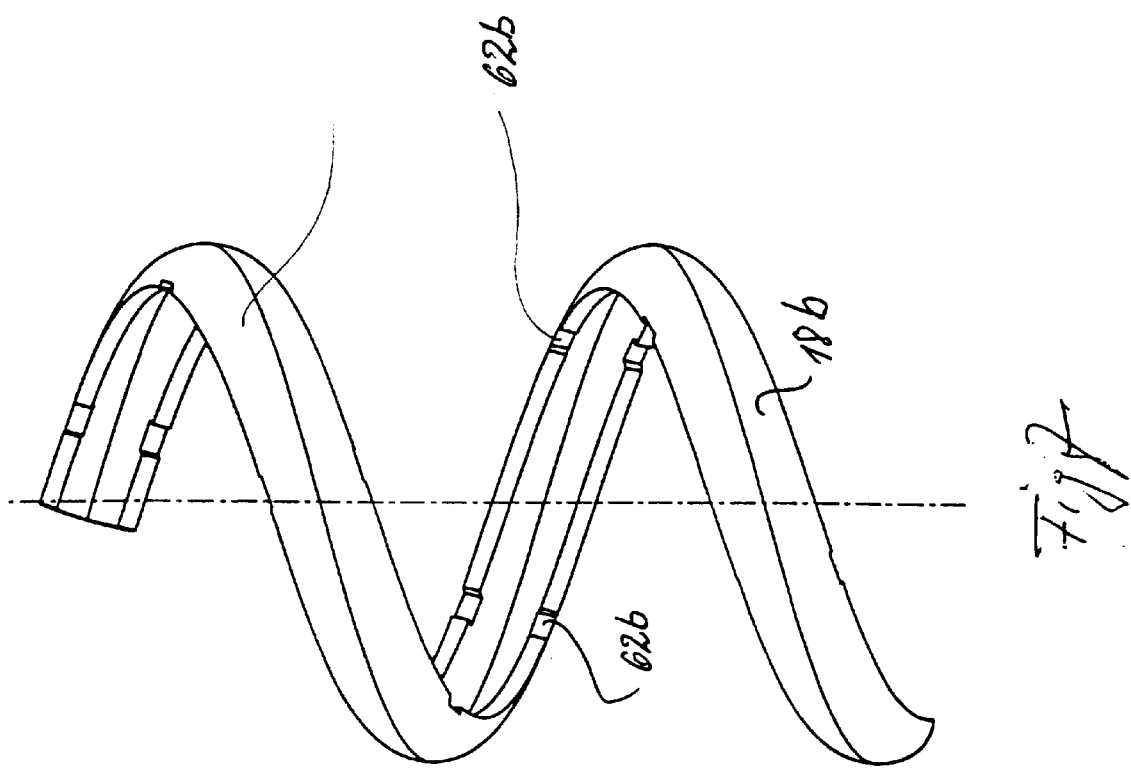

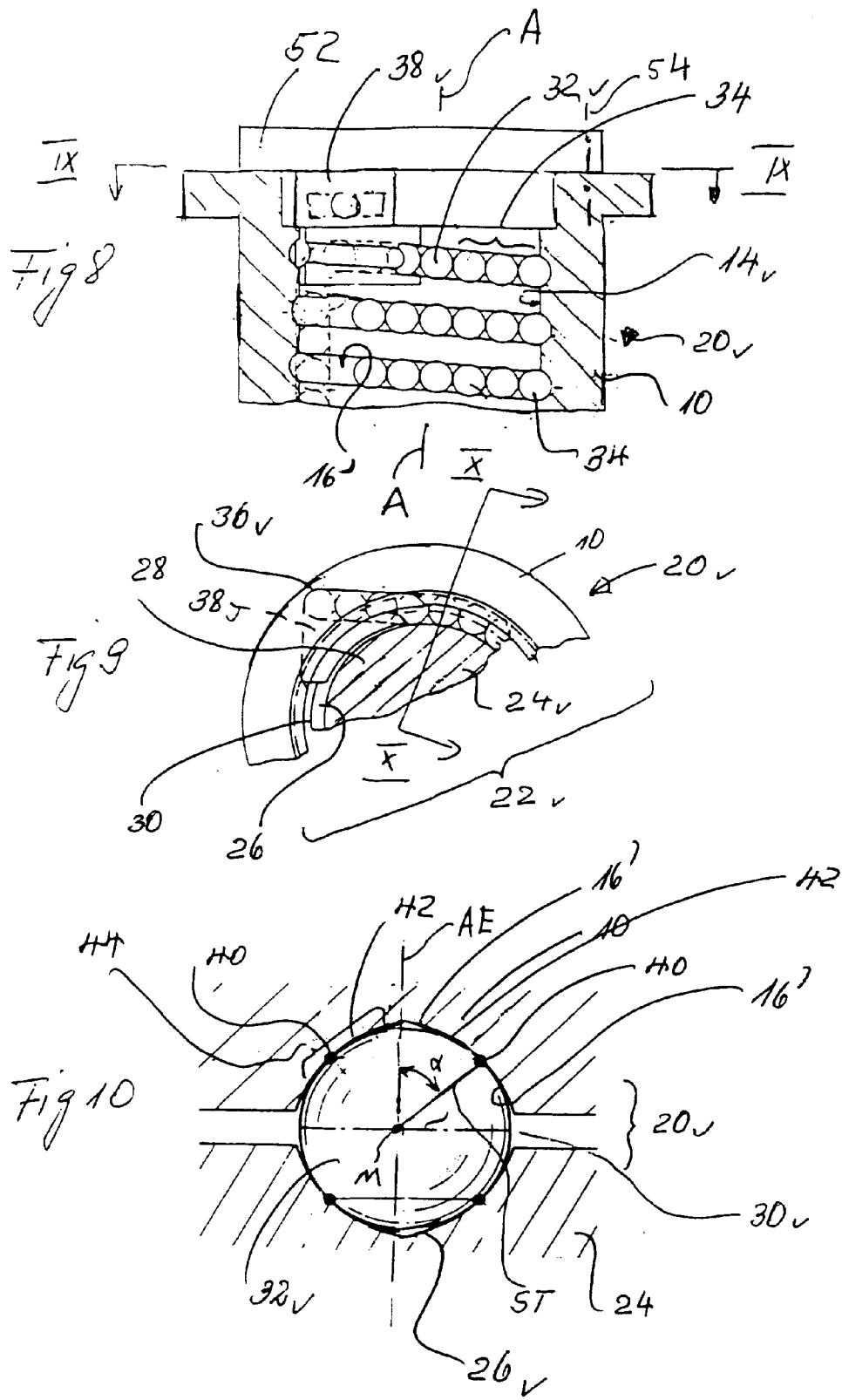

NUT UNIT

BACKGROUND OF THE INVENTION

The invention relates to a nut unit for use in a ball screw drive, comprising a sleeve-shaped nut body that is made of an essentially rigid material and that has an axis and an inner circumferential surface, wherein a one-piece, ball-guiding helix of strip material—which is channel-shaped as viewed in transverse cross-section—is arranged on the inner circumferential surface of the nut body, wherein the helix of strip material is attached to the inner circumferential surface of the sleeve-shaped nut body by a convexly curved external profile, the latter being embodied with external profile flank regions and an external profile crown region, and the helix defines, by means of a concavely curved internal profile facing the axis, a ball channel with an internal profile base region and two internal profile flank regions.

In order to form a ball race, it is known from DE 27 32 896 C2 to apply to the inner circumferential surface of a sleeve-shaped nut body a channel-like, profiled metal strip which is rigidly attached along its entire length to the inner circumferential surface of the nut body. The flanks of the metal strip extend out into the central space of the nut body, which is to say that they are not supported outside of the base region. Moreover, known from DE 27 32 896 C2 is an embodiment (see FIG. 3) wherein a profiled metal strip is attached by vulcanization to the inner circumferential surface of a bushing made of elastically deformable material. The subject there is thus not a nut body of an essentially rigid material, but of an elastically deformable material.

It is known from DE 28 05 141 to cut a helical profiled groove in the inner surface of a sleeve-shaped nut body and to allow the balls of a continuous set of balls to run directly in this profiled groove on the nut side. In this connection, high demands are placed on the profiled groove with respect to the surface characteristics of the bearing race region, in particular with respect to hardness and smoothness.

In order to create a helicoid profiled groove on the inner circumferential surface of a nut body, it is known from DE 30 28 543 to lay a round wire helix on the inner circumferential surface of a nut body and to arrange it in a helicoid manner by means of ribs on the inner circumferential surface of the nut body. Therein, the balls of an associated ball set each run between two adjacent turns of the round wire. It is further known from DE 30 28 543 to form a cylindrical tube into a screw-like helix to form a nut unit and to slit this tube on the inner side of the helix, so that the balls of a ball set carried in the tube can project radially inward and engage the threads of a spindle.

SUMMARY OF THE INVENTION

In contrast, it is proposed in accordance with the invention that the outer profile flank regions of the strip material helix be essentially rigidly supported by a support profile of a support groove formed in the inner circumferential surface of the nut body.

The following is achieved by the arrangement in accordance with the invention, in contrast to the state of the art discussed above: in comparison to the first embodiment per DE 27 32 896 C2, an increased stiffness is achieved. Owing to the support by the support groove in the external profile flank regions, deformation of the strip material is in any case largely suppressed if not completely precluded. The strip material can neither tip nor be bent. On the other hand, the surface of the strip material helix in the region of the concavely curved internal profile of the support groove can be finished with respect to hardness and smoothness prior to the installation of the strip material helix in the nut body, and if desired at the strip material itself prior to its forming or at least prior to its final shaping. This has particularly great importance when large thread pitches are required for the ball nut, a requirement that is occasionally present in the case of machine tools in order to be able to increase the feed rates without having to raise the spindle speed to levels that are critical in terms of bending. When large nut thread pitches are required, it becomes increasingly difficult to perform smoothing operations, in particular grinding, on the finished threads as the pitch increases.

Also in contrast to the second embodiment per DE 27 32 896 C2, wherein the metal strip is attached by vulcanization to the inner circumferential surface of a bushing of elastically deformable material, the embodiment in accordance with the invention provides the important advantage, owing to the essentially rigid support of the external profile flank regions by the support profile of the support groove, that the strip material can neither tip nor be bent and cannot yield in any other way, which is precisely the goal of the known embodiment with respect to the change in pitch that is striven for therein.

In contrast to the known embodiment per DE 28 05 141, the effect is achieved that surface treatment with regard to hardness and smoothness in the ball race is possible without regard to the thread pitch, because smoothing and hardening treatments are possible before installation in the nut body and even before shaping of the strip material helix, but in any case prior to its final shaping.

In contrast to the first-described known embodiment per DE 30 28 543 A1, wherein balls are guided on the nut body between two adjacent turns of the round wire helix, the advantage is achieved that balls are guided on the nut body by a one-piece channel profile, resulting in a better and easier to manufacture precision and in higher load capacity. In contrast to the further embodiment described in DE 30 28 543 A1, wherein balls are guided in a tube that is rolled into a spiral and cut on the inside of the spiral, the advantage of increased stiffness is again achieved owing to the support of the external profile flank regions by the support profile of the support groove.

The proposed invention can in particular find application when the concavely curved internal profile is shaped such that balls of an associated ball set of predetermined nominal diameter run on bearing race tracks of the internal profile flank regions, each of which bearing race tracks lie within a track region of the relevant internal profile flank region. In such an embodiment of the ball channel, the strip material helix is stably supported by the support of its external profile flank regions by the support profile of the support groove at or in the immediate vicinity of the bearing race track and/or the bearing race tracks that are possible as a result of altering the ball diameter, so that maximum stiffness of the ball screw drive can be achieved.

When reference is made to a track region, in particular that track region is meant that is determined by the possible bearing race tracks which result from a group of ball sets with nominal diameters graduated from ball set to ball set that are available to set a specific preload range for the ball screw drive. In this connection, the nominal diameter in each case determines the "pressure angle" (defined hereinafter).

A first embodiment of the invention resides in that a support—based on physical contact—of an external profile flank region on the support profile of the support groove extends over a contact zone corresponding approximately to the total extent of the track region along the curved internal profile and—if desired—extends beyond the borders of the track region. In this first embodiment, all conceivable bearing race tracks that result from changing the nominal ball diameter are supported directly and free of bending on the back side, which is to say in the external profile flank region, so that optimal stiffness is achieved. However, in this embodiment a relatively high precision is demanded in the manufacture of the external profile flank regions and the support profile.

In accordance with a second embodiment of the invention, provision is made for the support, based on physical contact, of an external profile flank region on the support profile of the support groove to be limited to contact zones that correspond to boundary zones of the associated track region and that are spaced from each other in the direction of curvature of the curved external profile and that —if desired—extend beyond the boundary zones of the track regions. In this second embodiment, the support of each external profile flank region is accomplished in the manner of or similar to a two-point support, each approximately in the boundary zones of the associated track region. One can say that the channel-shaped strip material helix, viewed in cross-section, forms an essentially rigid bridge across an interruption of the physical support. An adequately rigid support can be reckoned with in this embodiment as well when the strip material wall thickness and the spacing of the contact zones are appropriately matched.

In both embodiments a stable support of the channel-shaped strip material helix is provided independent of the particular pressure angle (defined hereinafter).

It is possible that the convexly curved external profile and/or the support profile of the support groove extend essentially without kinks at least over the length of the associated track region. However, it is also possible that the convexly curved external profile and/or the support profile are polygonal or polylobal, at least over the length of the associated track region. In both possible cases, either full-area support over the entire track region or bridge-like support can be chosen.

With regard to the achievement of improved fitting of the relevant balls against the internal profile flank regions, a preferred embodiment resides in that the internal profile curve is essentially ogival in shape at least in its internal profile flank regions. Provision is advantageously made herein that the concavely-curved internal profile and the convexly curved external profile are essentially equidistant at least over the length of the internal profile flank regions of the curved internal profile. The latter measure achieves the result that when manufacturing the strip material helix one can start with a plane parallel or approximately plane parallel flat strip, and the strip material helix receives a channel-shaped cross-section with a minimum of forming work.

With regard to simplification of the forming work during manufacture of the channel-shaped helix of strip material, and also to the placement of the strip material helix on the support profile, it can be advantageous if the strip material in the base region of the concavely curved internal profile is weakened about a base centerline with regard to the bending section modulus. This weakening of the bending section modulus can be achieved, for example, in that the strip material has a recess in the base region of the curved internal profile. The recess can be formed as early as during fabrication of the strip material or can be formed thereupon later, for example with an ogival profile. However, it is also possible to generate the recess during the course of rolling a flat strip into channel profile. Weakening of the bending section modulus facilitates shaping of the channel-shaped helix of strip material into its final form, thus ensuring that the critical surfaces for the ball race and for supporting the channel-shaped helix of strip material can be fabricated with high precision.

Additional measures can be taken to ensure that the strip material in the direction of the convexly curved external profile is secured against shifting in position relative to the support profile, at least along the length of the track region. Thus it is possible, for example, for the strip material to be glued to the support profile. In this event, the adhesive layer can also perform an equalizing function between the strip material and the support profile. Of course, in the event that the adhesive layer is assigned an equalizing function, it is desirable to ensure that the adhesive layer possesses adequate indentation hardness so that deformability of the adhesive layer does not jeopardize the stiffness of the ball screw.

The additional securing of the strip material can also be achieved in that the edges of the strip material that are distant from the base region are fixed to the nut body—if desired under preloading—through positive locking. Such positive locking can be produced by means of recesses in the strip material on its edges distant from the base region. Furthermore, positive locking can be produced by caulking the nut body in the vicinity of the edge regions of the support profile. It is beneficial for the stiffness of the ball screw drive if the strip material is pressed radially outward into the support profile along the entire course of its helix. Some of the pressure can be applied by the balls when they are subjected to preloading between the spindle and the strip material helix, a preloading which in turn is beneficial for the stiffness of the ball screw drive. However, it is also possible for the strip material to be pressed against the support profile of the support groove of the nut body under radial preloading independently of the preloading of the balls, in particular owing to radial overdimensioning of the helical strip material prior to installation in the support groove.

At least in its layer near the inner circumferential surface, the nut body can be made of metal, preferably steel. In this event, the customary thread cutting processes may be used to manufacture the helical support groove.

At least in a layer near the curved internal profile, the strip material helix can be made of metal, preferably steel. Fabrication of the strip material helix out of a flat strip by producing the channel cross-section and by subsequent winding can take place on a conventional spring coiling machine. It is possible for the production of the channel and the winding to take place simultaneously in one step, or to be performed one immediately following the other. Rolling of the recess in the base region can also be included in this step as a preliminary stage.

The support groove on the inner circumferential surface of the nut body can be produced through a thread-cutting process and left essentially without finishing by hardening and grinding. Therein lies a substantial advantage of the invention: if neither hardening nor smoothing of the nut body is necessary after thread cutting, because hardening and/or smoothing is done on the strip material or the partially or fully shaped helix of strip material, the overall fabrication of the nut unit is substantially simplified, in particular for the case of large thread pitch addressed above.

This is surprising inasmuch as one could assume in principle that the simplest and most precise manufacture of the ball nut unit would be obtained if one were to simply cut a thread suitable for direct ball guidance in the inner circumferential surface of a ball nut blank.

With regard to minimization of wear and also high carrying power of the spindle screw drive, the helix of strip material should be hardened at least in one layer near the curved internal profile, where it should be hardened at least in the vicinity of the bearing races. This hardening can be done in a simple way prior to installation of the strip material helix in the nut body. In order to have available the most ductile possible strip material when shaping the channeled strip material helix, it is recommended that hardening be done after shaping of the strip material helix is completed or at least partially completed.

With regard to smooth ball travel, and also with regard to high stiffness and machining precision of the ball screw drive, it is desirable for the strip material helix to be smoothed at least in the track region. What is special about the invention in this regard is that the smoothing does not necessarily have to take place after installation of the strip material helix in the support groove, which—as already mentioned—is difficult, especially when the pitch of the strip material helix is great. Instead, it is possible to undertake the necessary smoothing operations on the intermediate product, for example during fabrication of the strip or when shaping the channel profile, or when winding the strip material into a helix. The smoothing can be achieved more particularly by a rolling treatment, which preferably can take place before any hardening in order to have the advantage during the smoothing process as well of the higher ductility of the material to be worked.

When manufacturing the nut unit in accordance with the invention, it is possible to proceed in that one introduces into an unhardened, sleeve-shaped nut body blank a helical support groove with a support profile using a thread-forming process, in that one forms a strip material into a channel-shaped strip material helix with a smooth surface, at least in the track regions of the internal profile flank regions, and in that one introduces the strip material helix into the helical support groove. The advantage of this process is that a nut unit is manufactured for a stiff ball screw drive with high surface quality of the ball races, even if the machining circumstances are unfavorable, for example because of large pitch for the threads. The strip material helix can be obtained by rolling an initially essentially flat, straight steel strip into an essentially straight channel profile, and subsequently winding the channel profile into a strip material helix.

Hardening of at least the track regions can be done preferably after the formation of the channel profile and the winding process, and preferably before introduction into the helical support groove; conventional processes, for example inductive hardening (penetration hardening) or case-hardening (surface hardening), may be used.

A smoothing treatment can be undertaken more simply before the geometry of the strip material helix has been finalized, for example by means of a rolling treatment before or during formation of the channel-shaped strip material helix.

When manufacturing the strip material helix, it is possible to start with flat strip material or strip material in roll form, which, in the base region, is weakened about a base centerline with regard to the bending section modulus.

The strip material used to form the helix can be produced through drawing or rolling or cutting.

The support profile can be produced using a conventional thread-forming process, more particularly thread cutting process. Subsequent hardening or smoothing of the support profile is not necessary.

The nut unit in accordance with the invention can be equipped with ball sets of different nominal diameters. When this is done, it is desirable to observe the following: the starting point for assembling a ball screw drive or ball screw is the desired preloading of the balls between the spindle and nut unit. The nominal diameter for the balls is a result of the actual dimensions of the spindle bearing race and nut bearing race. If one selects a certain nominal diameter for the balls of the ball set in question based on a certain preloading of the balls, a certain pressure angle ensues. The pressure angle is defined as the angle between a reference plane perpendicular to the axis and a ray from the ball mid-point to the contact point between the ball and race. Of course, the pressure angle also depends upon the manufacturing precision of the spindle and nut. If one wishes to select different preloading stages, one must work with ball sets whose balls accordingly have different nominal diameters. Different pressure angles ensue accordingly.

BRIEF DESCRIPTION OF THE DRAWINGS

The attached figures illustrate exemplary embodiments of the invention, in which:

FIG. 3 is a transverse cross-section along line III—III from FIG. 2;

FIG. 4 is an enlarged detail of area IV from FIG. 1;

FIG. 5 is a transverse cross-section corresponding to the one in FIG. 3 with a modified profile shape of the strip material helix;

FIG. 7 is a side view of a modified embodiment of the strip material helix;

FIG. 8 is a partial cross-section corresponding to the one in FIG. 1 with a nut unit that has been completed with balls and a ball reversing element;

FIG. 9 is a view in partial section along line IX—IX of FIG. 8, and

FIG. 10 is a cross-section along line X—X in FIG. 9.

DETAILED DESCRIPTION OF EXEMPLARY EMBODIMENTS

Figure 1:
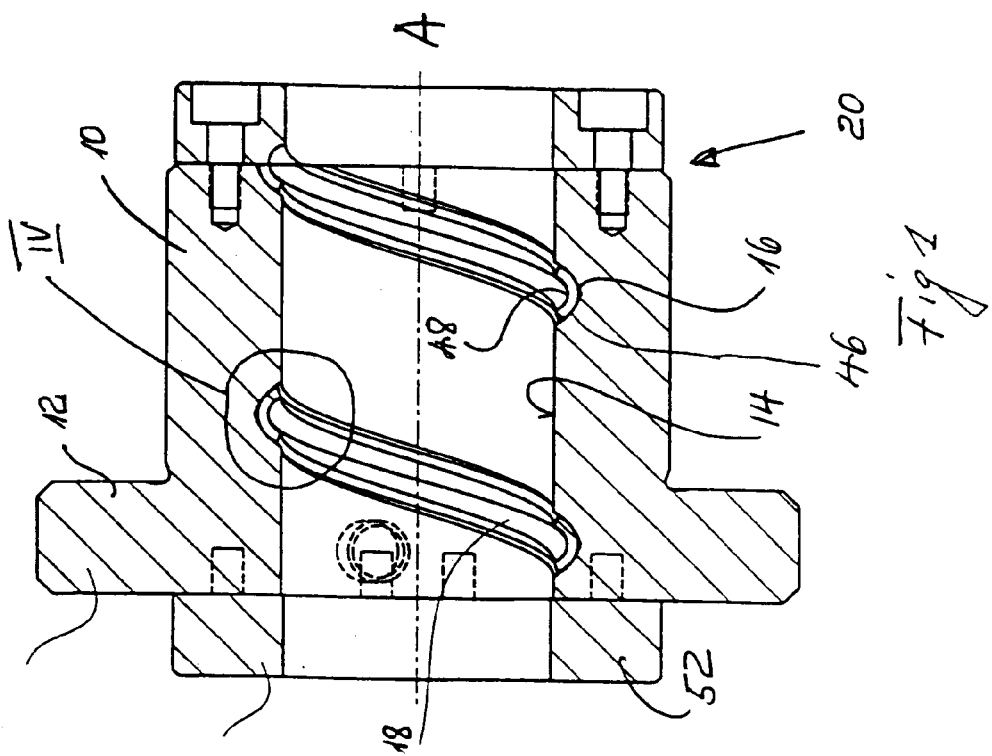
FIG. 1 is an axial cross-section through a nut unit in accordance with the invention.

In FIG. 1, a nut body 10 has the basic form of a cylindrical sleeve having an axis A and a mounting flange 12 for mounting in a component (not shown) whose bore accommodates the nut body. Cut into the inner circumferential surface 14 of the nut body 10 is a concavely-curved helical support groove 16. The support groove 16 extends along the entire length of the nut body 10. Inserted in the support groove 16 is a strip material helix 18. The nut body 10 is part of a nut unit 20, which is shown in a larger context in FIGS. 8–10.

As there shown, the nut unit 20 is part of a ball screw drive 22 (see FIG. 9), which includes a threaded spindle 24 in addition to the nut unit 20. Cut into the inner circumferential surface 14 of the nut 20 in FIG. 8 is a concavely-curved helical profile groove 16'. The helical profile groove 16' forms, together with another helical profile groove 26 in the outer circumferential surface of the spindle 24, a helical ball channel 30, which accommodates a plurality of balls 32. The balls 32 of the ball channel 30 form part of a continuous ball loop 34, which runs through a return channel 36 outside of the ball channel 30 (see FIG. 9). Provided at the transitions between the helical ball channel 30 and the return channel 36 are reversing pieces 38, in which reversing channels are formed (see FIG. 8). When the nut body 10 rotates relative to the spindle 24 about the axis A, the balls in the ball loop 34 travel sequentially through the helical ball channel 30, a reversing channel at 38, the return channel 36, and through the other reversing channel (not shown) back into the helical ball channel 30.

Figure 2:
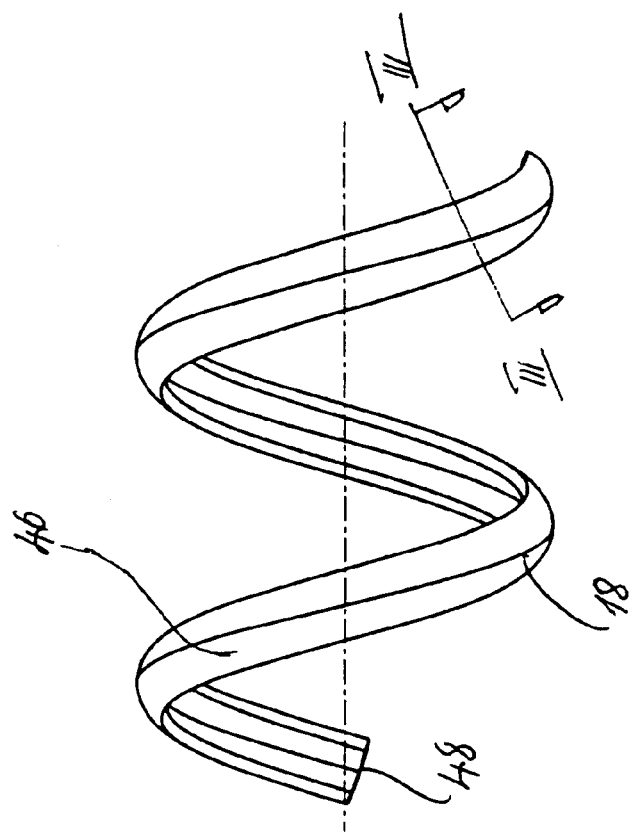
FIG. 2 is a side view of a helix of strip material prior to installation in a nut unit from FIG. 1.

For simplicity's sake, the strip material helix 18 shown in FIG. 2 is not shown in FIGS. 8, 9 and 10; instead the helical profile groove 16' is shown cut directly into the nut body 10 in order to simplify the illustration. FIG. 10 depicts a helical profile groove 16' with an ogival cross-section. One can see a ball 32, which in the bearing points 40 rests against circular arc-shaped flanks 42 of a profile arc. The profile arc defines the profile of the helical profile groove 16'. It is obvious from FIG. 10 that the position of the bearing points 40 is dependent on the diameter of the ball 32. The bearing points 40 define the bearing race tracks of the balls 32 on the arc-shaped flanks 42. The bearing points 40 lie on various points within a track region 44, depending on ball diameter, and each defines a pressure angle $\alpha$, which varies as a function of the ball diameter. The "pressure angle" $\alpha$ is shown as the angle between a plane AE perpendicular to the axis A and a ray ST, which connects the ball mid-point M to the contact point 40.

Due to the absence of the strip material helix in FIGS. 8–10, the ball screw drive 22 shown therein should be understood only as a representational basis for the nut unit in accordance with the invention.

Details of one embodiment of the nut unit in accordance with the invention are shown in FIGS. 3 and 4. Visible again is the nut body 10 with the concavely-curved helical support groove 16 in which is inserted the strip material helix 18. In FIG. 3, the strip material helix 18 is shown in transverse cross-section along line III—III from FIG. 2. It is defined by a convexly-curved external profile 46 and a concavely-curved internal profile 48. The curved external profile 46 is composed of two adjacent ogival external profile flank regions 46' and an external profile crown region 46". The curved internal profile 48 is composed of two ogival internal profile flank regions 48' and an internal profile base region 48". The ogival shape is hardly discernible in FIG. 3 because of the small scale. It can be seen more easily in FIG. 4. The helical support groove 16 defines a support profile which 16 is polylobal in cross-section and which is composed of the support profile sections 16-1 and 16-2. The radii R16-1 and R16-2 of the support profile sections 16-1 and 16-2 are slightly larger than the radii R46' of the external profile flank regions 46' of the curved external profile 46. The centers of curvature of the individual radii are labeled as follows:

Center of curvature MR16-1 of the radius R16-1 of the support profile sections 16-1 of the support profile of the profile groove 16;

Center of curvature MR16-2 of the radius R16-2 of the support profile sections 16-2 of the support profile of the profile groove 16;

Center of curvature MR46' of the radii R46' of the external profile flank regions 46' of the curved external profile 46; and Center of curvature MR48' of the radii R48' of the internal profile flank regions 48' of the curved internal profile 48.

In the exemplary embodiment shown, the radii R46' and R48' each have the same center of curvature (MR46'= MR48').

The radii of the associated balls are slightly smaller than the radii R48' in order to achieve good fit and low surface pressure.

One can see that the external profile flank region 46' rests against the support profile sections 16-1 and 16-2 of the polylobal support profile of the helical support groove 16 at two contact points 50-1 and 50-2. The distance of separation of the centers of curvature MR46' and MR48' for the left and right profile flanks, respectively, is labeled d (see FIG. 4). In FIG. 4 as well, the track region is labeled 44, e.g. the specific region in which balls of varying nominal diameters contact the curved internal profile 48. In this regard, please also see FIG. 10, where the bearing points and thus the bearing races of the ball 32 are labeled 40, and again lie within the track region 44. The internal profile flank regions 48' of the curved internal profile 48 and the external profile flank regions 46' of the curved external profile 46 are equidistant; their spacing is labeled t. This spacing corresponds to the difference between the radii R46' and R48'.

One can see that the track region 44 lies within a bridge section B (see FIG. 4) that constitutes part of the strip material helix 18. When the balls that are used have different nominal diameters, their bearing points 40 (see FIG. 10) always lie within the bridge section B that extends between the contact points 50-1 and 50-2. A stable two-point-support at each individual turn of the strip material helix 18 in the helical support groove 16 is thus always ensured, regardless of the angular position of the bearing points 40 (see FIG. 10). This angular position is labeled $\alpha$ in FIG. 10. It is referred to as "pressure angle $\alpha$". Obviously, the contact points 50-1 and 50-2 are not strictly punctiform. The contact as in FIG. 4 extends over finite contact zones on both sides of the contact points 50-1 and 50-2. These contact zones are likewise designated 50-1 and 50-2 for the sake of simplicity. The contact zones 50-1 and 50-2 are associated approximately with the limits G44 of the track region 44 when viewed in the depth direction T.

It is obvious that the positional stability within the helical support groove 16 of the strip material helix 18, or more precisely each individual turn of the strip material helix 18, is assured especially well when the strip material helix 18 fits snugly against the support profile of the support groove 16 over the entire length of its curved external profile 46. However, it is easy to understand that a snug fit of the strip material helix 18 over the entire length of its curved external profile 46 against the support profile of the support groove 16 requires even greater precision in machining. Consequently, from the perspective of simplified manufacture, the embodiment of FIG. 4 is preferred over embodiments in which large-area support between the strip material helix 18 and the support groove 16 is desired.

It is easy to understand that the bridge-like arrangement of the strip material helix 18 in the vicinity of the bridge section B can also be achieved through appropriate design of the profile shape of the curved external profile 46.

The nut body 10 preferably is comprised of a non-hardenable steel. The support groove 16 is cut in with conventional thread-cutting tools. The pitch of the helical support groove 16 is freely selectable. For a diameter range of the inner circumferential surface 14 of from 4 mm to 120 mm, the pitch may, for example, be in a range from 10 mm to 40 mm, and can, for example, be up to three times the diameter of the inner circumferential surface 14.

The strip material helix 18 preferably is comprised of a hardenable steel. It is initially supplied as a flat strip. This flat strip is rolled to achieve the cross-sectional shape shown in FIG. 3. During the process, the internal profile flank regions 48' are smoothed by the rolling. Then the channeled profile 19 thus obtained as in FIG. 3—still straight—is wound into strip material helix 18 as in FIG. 2. This can be done on a modified spring coiling machine. This is followed by hardening of at least the internal profile flank regions 48' that form the ball race 21 (see FIG. 3), for example using the process of inductive hardening, which would produce penetration hardening, or using surface hardening of the ball race 21. Subsequently, the strip material helix 18 is introduced into the helical support groove 16. This can be accomplished by screwing it in.

After successful installation of the strip material helix 18 in the helical support groove 16, the nut unit 20 is completed as in FIGS. 8 and 9 through installation of the balls 32 and the reversing elements 38. To complete the assembly, the end caps 52 visible in FIGS. 1 and 8 are installed, for example by means of clamping screws 54. When the end caps 52 are attached, they can be brought into contact with the two ends of the strip material helix 18 so that the latter cannot shift within the support groove 16 during operation. Perfect seating of the strip material helix 18 within the support groove 16 is ensured in that the strip material helix 18 before installation has a somewhat larger diameter than the support groove 16, with the result that preloading is of necessity accomplished during installation.

FIG. 5 shows a strip material helix 18a with modified cross-section. An ogival recess 56a is provided here in the base region 48"a, which recess can be formed during rolling of the flat profile, can also be milled in, and finally can also be formed during rolling into channel profile through appropriately shaped rolling tools. The recess 56a causes the bending section modulus of the channel profile to be weakened about the bending axis C in the recess region 56a. This results in easier fitting of the curved external profile 46a to the cross-sectional shape of the helical support groove 16.

Figure 6:
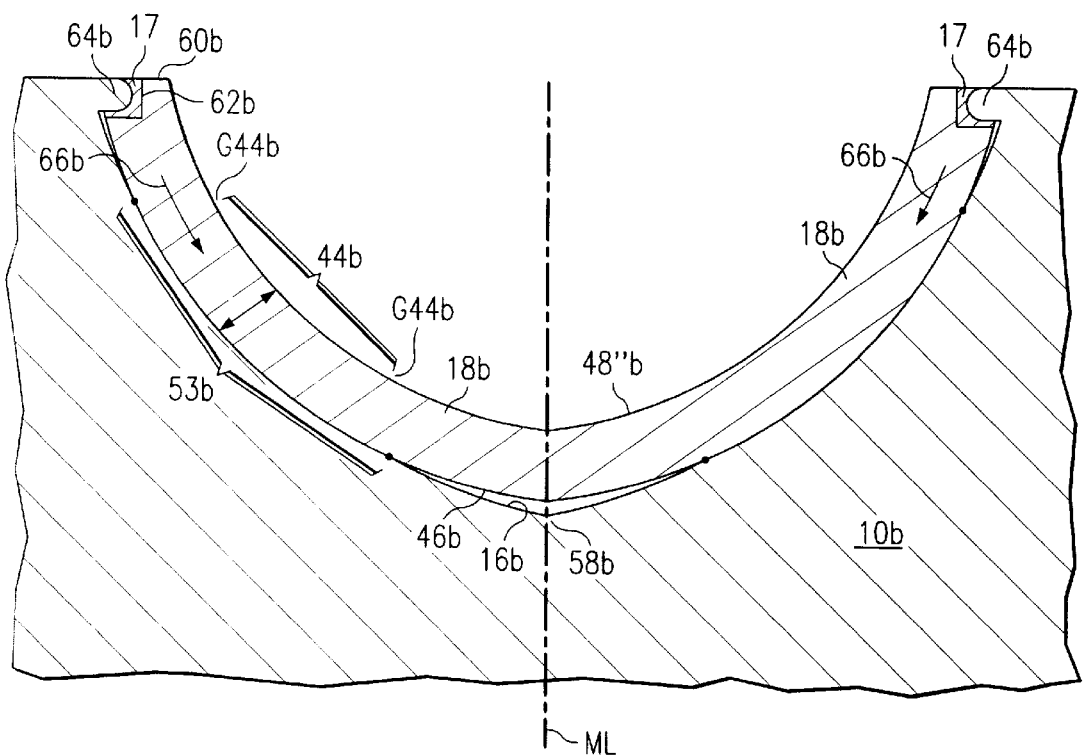
FIG. 6 is an enlarged partial section corresponding to the one in FIG. 4 with a modified profile shape of the helical support groove of the nut body.

FIG. 6 shows how the channeled strip material helix 18b can be pressed into the support groove 16b. It is also clear from FIG. 6 that the curved external profile 46b of the strip material helix 18b can snugly fit the support profile 16b of the support groove 16b along the entire length of the track region 44b, forming contact zones 53b. It is possible to extend the contact zones 53b even further to the crown point 58b and to the edge region 60b. Applied at the edge regions 60b of the strip material helix 18b are notches 62b, as shown also in FIG. 7, which can be mortised into projections 64b of the nut body material, e.g., by crimping the projections 64b into the notches 62b, so as to thus shift the strip material helix 18b in the direction of the arrow 66b, thereby making the system even more tightly sealed, at least in the contact zones 53b.

It is also possible to make or support the connection between the strip material helix 18b and the support groove 16b through gluing, as indicated, for example, at 17 in FIG. 6. Gluing can take place in addition to the projections 64b and/or to the shifting by the end caps 52.

In the embodiment in FIG. 6, the profile of the support groove is likewise essentially ogival, and can be formed by one arc section on each side of the center line ML, for example a section of a circular arc on each side.

In an advantageous embodiment of the invention, see FIG. 4, for example, the curved internal profile 48, the curved external profile 46 and the support profile of the support groove 16 are nearly ogival or pointed in shape, and the balls have a nominal diameter that approaches the radii R48'. In a design of this nature, the strip material helix 18 cannot shift relative to the nut body 10 as pressure angles α change. In addition, the strip material helix 18 can be fixed against displacement through contact with the end caps 52, and also through the means of securing shown in FIG. 6 at 62b and 64b. The weakening resulting from the recess 56a as in FIG. 5 makes it possible for the channel profile of the strip material helix 18 to elastically deform, and thus to lie against the support profile of the support groove 16 in all four contact points or contact regions 50-1 and 50-2 as in FIG. 4.

What is claimed is:

1. A nut unit for a ball screw drive, comprising:

a sleeve-shaped nut body, said body having an inner circumferential surface and a central axis (A) and being made of an essentially rigid material;

an axially extending helical groove formed in the inner circumferential surface of said nut body, said groove defining a concavely-curved support profile in said circumferential surface facing said axis (A);

a one-piece, ball-guiding helix formed of strip material mounted in said helical groove, said strip material helix having a channel-shaped transverse cross section which, on the radially outer side thereof, has a convexly-curved external profile having two external flank regions separated by an external crown region and, on the radially inner side thereof, has a concavely-curved internal profile having two internal flank regions separated by an internal base region, said external profile flank regions being radial opposite said internal profile flank regions;

said external profile flank regions of said helix being essentially rigidly supported by said support profile of said support groove;

said support profile of said support groove physically contacting each external flank profile region of the helix over a contact zone that extends at least substantially over the total extent of the track region of the opposed curved internal profile of the helix;

said contact zone extending beyond the extent of the track region of the opposed curved internal profile of the helix;

said curved internal profile of said helix comprising a ball channel for receiving the balls of said ball screw drive; and said curved internal profile being shaped such that balls of an associated ball set of a predetermined nominal diameter run on bearing race tracks of said internal profile flank regions, each of which bearing race tracks lies within a track region of the respective internal profile flank region.

2. A nut unit for a ball screw drive, comprising:

a sleeve-shaped nut body, said body having an inner circumferential surface and a central axis (A) and being made of an essentially rigid material;

an axially extending helical groove formed in the inner circumferential surface of said nut body, said groove defining a concavely-curved support profile in said circumferential surface facing said axis (A);

a one-piece, ball-guiding helix formed of strip material mounted in said helical groove, said strip material helix having a channel-shaped transverse cross section which, on the radially outer side thereof, has a convexly-curved external profile having two external flank regions separated by an external crown region and, on the radially inner side thereof, has a concavely-curved internal profile having two internal flank regions separated by an internal base region, said external profile flank regions being radial opposite said internal profile flank regions;

said external profile flank regions of said helix being essentially rigidly supported by said support profile of said support groove;

said support profile of the support groove physically contacting each external flank profile region of the helix substantially only at contact zones that are spaced apart, in the direction of curvature of the curved external profile, so as to encompass the total extent of the track region of the opposed curved internal flank region of the helix;

said curved internal profile of said helix comprising a ball channel for receiving the balls of said ball screw drive; and said curved internal profile being shaped such that balls of an associated ball set of a predetermined nominal diameter run on bearing race tracks of said internal profile flank regions, each of which bearing race tracks lies within a track region of the respective internal profile flank region.

3. A nut unit in accordance with claim 2, wherein the strip material helix, viewed in transverse cross section, forms an essentially rigid bridge, without contact with the support profile of the support groove, between said spaced contact zones.

4. A nut unit for a ball screw drive, comprising:

a sleeve-shaped nut body, said body having an inner circumferential surface and a central axis (A) and being made of an essentially rigid material;

an axially extending helical groove formed in the inner circumferential surface of said nut body, said groove defining a concavely-curved support profile in said circumferential surface facing said axis (A);

a one-piece, ball-guiding helix formed of strip material mounted in said helical groove, said strip material helix having a channel-shaped transverse cross section which, on the radially outer side thereof, has a convexly-curved external profile having two external flank regions separated by an external crown region and, on the radially inner side thereof, has a concavely-curved internal profile having two internal flank regions separated by an internal base region, said external profile flank regions being radial opposite said internal profile flank regions;

said external profile flank regions of said helix being essentially rigidly supported by said support profile of said support groove;

said curved internal profile of said helix comprising a ball channel for receiving the balls of said ball screw drive;

said curved internal profile being shaped such that balls of an associated ball set of a predetermined nominal diameter run on bearing race tracks of said internal profile flank regions, each of which bearing race tracks lies within a track region of the respective internal profile flank region; and at least one of the curved external profile of the helix and the support profile of the support groove being polygonal or polylobal over at least the extent of the track regions.

5. A nut unit for a ball screw drive, comprising:

a sleeve-shaped nut body, said body having an inner circumferential surface and a central axis (A) and being made of an essentially rigid material;

an axially extending helical groove formed in the inner circumferential surface of said nut body, said groove defining a concavely-curved support profile in said circumferential surface facing said axis (A);

a one-piece, ball-guiding helix formed of strip material mounted in said helical groove, said strip material helix having a channel-shaped transverse cross section which, on the radially outer side thereof, has a convexly-curved external profile having two external flank regions separated by an external crown region and, on the radially inner side thereof, has a concavely-curved internal profile having two internal flank regions separated by an internal base region, said external profile flank regions being radial opposite said internal profile flank regions;

a means for positive locking of the strip material edges that are distant from the base region to the nut body, said external profile flank regions of said helix being essentially rigidly supported by said support profile of said support groove;

said curved internal profile of said helix comprising a ball channel for receiving the balls of said ball screw drive, said strip material helix being secured against shifting in position relative to the support profile along at least the axial length of the track regions;

said positive locking means comprising projections on the nut body in the vicinity of the edge regions of the support profile and cooperating recesses in the strip material edges.

6. A nut unit in accordance with claim 5, wherein said strip material helix is glued to the support profile along at least the axial length of the track regions, said adhesive layer performing an equalizing function between the strip material helix and the support profile.

* * * * *

UNITED STATES PATENT AND TRADEMARK OFFICE
CERTIFICATE OF CORRECTION

PATENT NO. : 6,484,599 B2
DATED : November 26, 2002
INVENTOR(S) : Blaurock

It is certified that error appears in the above-identified patent and that said Letters Patent is hereby corrected as shown below:

Column 6,
Line 48, "FIG. 8, and" should read -- FIG. 8; and --

Column 10,
Line 33, "radial" should read -- radially --

Column 11,
Lines 7 and 51, "radial" should read -- radially --

Column 12,
Line 32, "radial" should read -- radially --

Signed and Sealed this

First Day of April, 2003

JAMES E. ROGAN
*Director of the United States Patent and Trademark Office*